July 2, 1963

W. R. DAVIS 3,096,011

CONTAINER WITH POURING SPOUT

Filed Sept. 4, 1962

INVENTOR:
WILLIAM R. DAVIS

BY Russell Foster

ATTORNEY

July 2, 1963 W. R. DAVIS 3,096,011
CONTAINER WITH POURING SPOUT
Filed Sept. 4, 1962 6 Sheets-Sheet 2

INVENTOR:
WILLIAM R. DAVIS
BY
T. Russell Foster
ATTORNEY

INVENTOR:
WILLIAM R. DAVIS
BY
R. Russell Foster
ATTORNEY

United States Patent Office 3,096,011
Patented July 2, 1963

3,096,011
CONTAINER WITH POURING SPOUT
William R. Davis, Lawrenceville, Ga., assignor to Sonoco Products Company, Hartsville, S.C., a corporation of South Carolina
Filed Sept. 4, 1962, Ser. No. 221,253
8 Claims. (Cl. 229—17)

This invention relates to containers and more particularly to a carton having a retractable pouring spout for dispensing finely divided material packaged therein.

In the packaging of finely divided material such as soap powder, salt, sugar and the like, it is a common practice to provide cartons formed of paperboard for such material and which have provided thereon a retractable pouring spout. Such a spout is generally movable from a closed to an open or pouring position to permit the material packaged in the carton to be dispensed and back to the closed position after each use. One such carton is shown in U.S. Patent No. 2,341,397 issued to M. A. Smith on February 8, 1944, entitled Carton.

A carton with a pouring spout such as is disclosed in Smith is the general type of carton with which this invention is concerned and such cartons are generally provided with a pouring spout formed from integral portions of the paperboard blank from which the carton is formed. Such a spout includes side portions or wings formed in the blank for sliding movement between paperboard plies on the carton and which, when the pouring spout is moved to the dispensing position, assume an upstanding position to form sides for the pouring spout.

The portions of the carton blank which form the pouring spout are generally secured together by means of an adhesive or the like. As such a pouring spout is moved between an open and closed position for each dispensing operation, it is manipulated many times before the carton is emptied imposing considerable wear and tear on the paperboard pouring spout. The stress of this continuous use on the laminated paperboard blank portions forming a carton pouring spout such as shown in the aforementioned patent frequently results in delamination of these blank portions and other deterioration of the spout limiting its useful life.

Another problem arises with a pouring spout having wings for the pouring spout sides which wings slide between confining plies of paperboard in a carton. The sliding movement of the wings bends the wings over the edges of the carton opening each time the pouring spout is manipulated and quickly produces a wrinkled and creased condition in the wings reducing their effectiveness and promoting sifting of the material out of the carton around the wings.

Many applications for cartons with a pouring spout of the type discussed above require the incorporation of a relatively wide pouring spout with cartons of relatively narrow width. An additional problem is encountered in such applications as if the width of such a pouring spout is reduced below a prescribed width to permit its accommodation in a narrow carton effective operation of the spout cannot be obtained.

Accordingly, a primary object of this invention is to provide a new and novel carton with a pouring spout which may be formed from a one-piece body blank to provide a pouring spout of rugged and simple construction which maintains its useful life until the carton contents have been consumed.

Another object of this invention is to provide a new and novel carton having an integral pouring spout which may be manipulated many times in excess of normal requirements between a closed and an open position for dispensing the packaged material without risk of separation of component parts of the spout.

A further object of this invention is to provide a new and novel carton with a pouring spout of inexpensive construction utilizing side wings slidable between paperboard plies on the carton for forming the sides of the spout which wings operate effectively throughout many uses of the spout without deterioration and which act to prevent the sifting of material out of the carton around the spout.

Still another object of this invention is to provide a new and novel carton with pouring spout which is formed from a one-piece body blank and which permits the incorporation of such a pouring spout in cartons of relatively narrow width without any sacrifice in the effectiveness of the spout.

This invention further contemplates the provision of a new and novel pouring spout for a carton formed from a one-piece body blank in which the pouring spout may be manipulated between a closed and open position for dispensing the packaged material a far greater number of times than permitted with presently known constructions without deterioration of the pouring spout, in which the pouring spout is retained of its own accord in the closed position when moved thereto, which prevents sifting of material around the pouring spout and which pouring spout may be selectively located within any wall of the carton.

Other objects and advantages of the invention will become apparent from the following description taken in connection with the accompanying drawings.

In general, the objects of the invention and related objects are accomplished by providing a carton having a wall which includes an outer ply, an intermediate ply and an inner ply secured together in overlapping relationship. The intermediate ply and outer ply are integrally connected together along a common upper edge defined by a fold line and a hinged tab is cut in the outer ply to define a spout opening having side edges. The intermediate ply has cut therein a central flap portion with elongated wings hingedly connected along each side and a hinged tongue forming an opening together with means for admitting the trailing portion of the wings are cut in the inner ply. The tongue, central flap portion and tab are secured together in overlapping relationship to form with the wings a pouring spout movable between a closed position flush with the carton wall and an open position with the wings movable slidably over the side edges of the outer ply spout opening from a retracted position between the inner and outer plies in the closed position of the spout to an elevated position to form side walls for the spout. The means cut in the inner ply for admitting the trailing portion of the wings during the sliding movement urge the wings against the spout opening side edges to reduce the bending of the wings and prevent finely divided material packaged in the carton from sifting out around the pouring spout.

The novel features which are believed to be characteristic of the invention are set forth with particularity in the appended claims. The invention itself, however, both as to its organization and method of operation may be best understood by reference to the following description taken in conjunction with the accompanying drawings in which:

Figure 1:
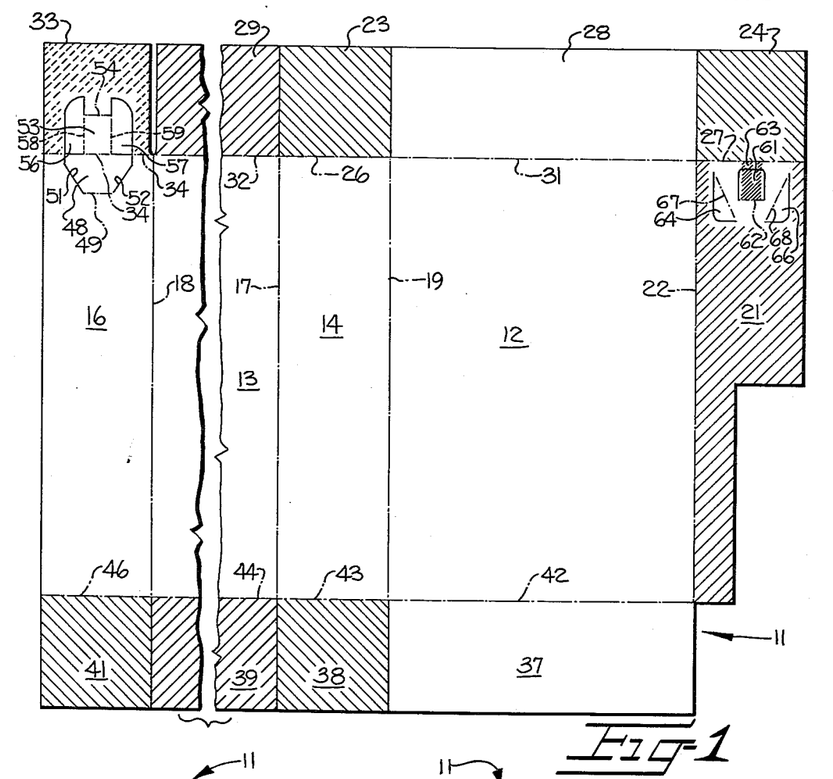
FIGURE 1 is a plan view, partially broken away, of a body blank used to form a carton constructed in accordance with the invention.
Figure 2:
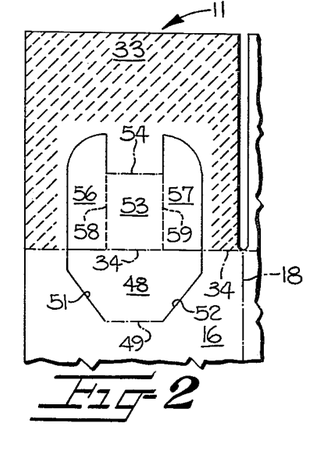
FIGURE 2 is an enlarged view of a portion of the body blank of FIGURE 1.
Figure 3:
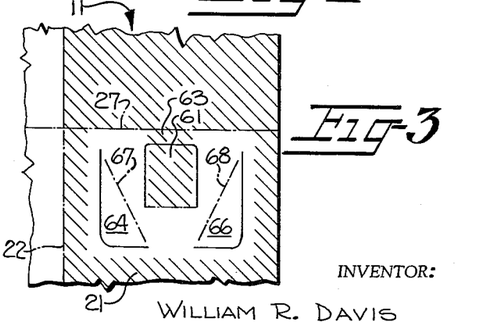
FIGURE 3 is an enlarged view of another portion of the body blank of FIGURE 1.

Referring now to the drawings and to FIGURES 1–3 in particular, there is shown a one-piece body blank from which one embodiment of the container or carton with pouring spout of the invention is constructed. The blank of FIGURE 1, which is designated generally by the numeral 11, is arranged to be formed into a carton suitable for the packaging of finely divided material such as soap powder, salt, and the like and is provided with a pouring or dispensing spout as will be explained hereinafter formed integrally with the carton through which such material is dispensed. The blank 11 may be formed from any suitable material such as paperboard or the like, coated or uncoated, and may be printed on one side with suitable indicia for advertising purposes, identification and the like.

The blank 11 includes side walls 12, 13, side wall 13 and being broken away for convenience and end walls 14, 16. Side wall 13 is integrally connected to end walls 14, 16 by means of fold lines 17, 18 respectively and side wall 12 is integrally connected to end wall 14 by fold line 19 and to an inner panel 21 by means of fold line 22. Top end flaps 23, 24 are connected to end panel 14 and inner panel 21 by means of fold line 26, 27 respectively and top end flaps 28, 29 are integrally connected to side panels 12, 13 by means of fold lines 31, 32 respectively. Flap 33, which forms in intermediate panel, is also provided and is integrally connected to end wall 16 by means of fold line 34. The top end panels 23, 24 and 29 to which a suitable adhesive has been applied, as indicated by the diagonal lines in FIGURE 1, may be folded together with flap 28 in the usual manner to form the top wall of the carton shown in FIGURE 4 and designated generally by the numeral 36.

The bottom wall of the carton 36 is formed by means of bottom flaps 37, 38, 39, 41 hingedly connected to panels 12, 14, 13, 16 by means of fold lines 42, 43, 44 and 46 respectively and adhesive is applied to the flaps 38, 39 and 41 as indicated by the diagonal lines in FIGURE 1 for securing these flaps in the well-known assembled relationship together with end flap 37 to form the bottom wall of the carton 36.

Figures 4, 5, 6:
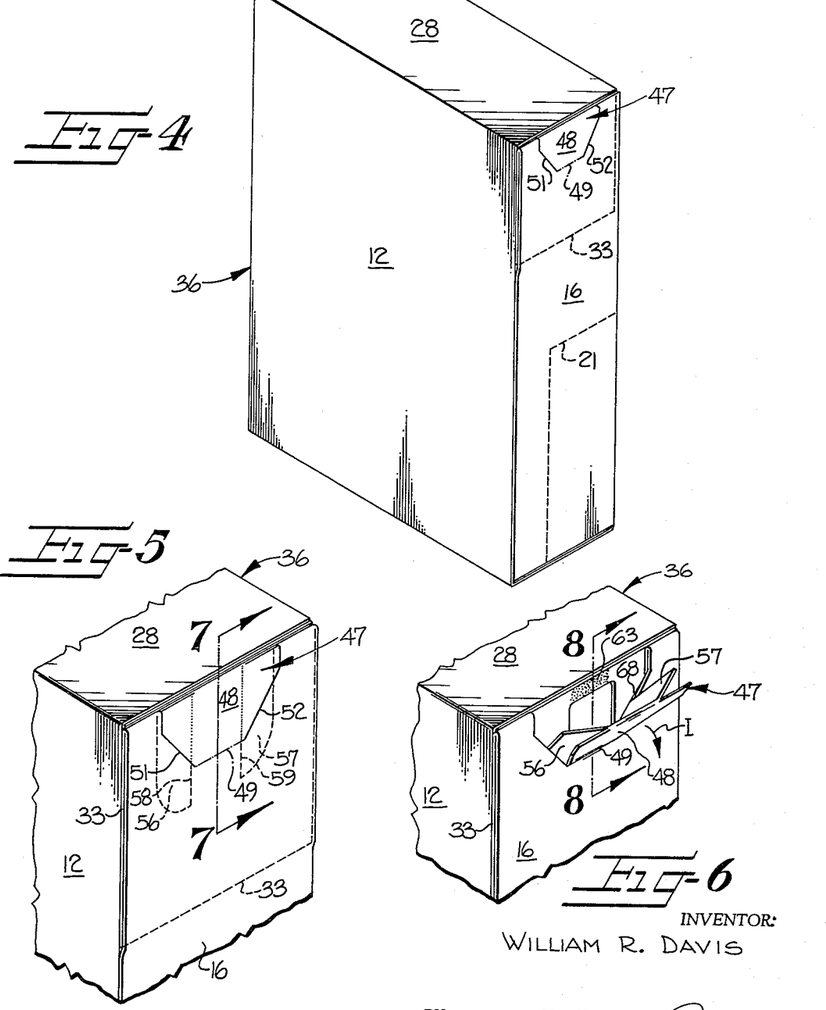
FIGURE 4 is an isometric view of a carton constructed in accordance with the invention from the body blank of FIGURE 1.
FIGURE 5 is an enlarged view of a portion of the carton of FIGURE 4 showing its pouring spout in the closed position.
FIGURE 6 is a view similar to FIGURE 5 showing the pouring spout in the open position.

The pouring spout incorporated in carton 36, which is designated generally by the numeral 47 is formed in a three ply structure from panel 16, flap 33 and inner panel 21 constituting an outer ply, an intermediate ply and an inner ply respectively. The panel 16 or outer ply has cut therein a tab 48 hinged along fold line 49 so as to provide a spout opening in the panel defined by diagonal side edges 51, 52.

The flap 33 or intermediate ply has a central portion 53 integrally connected to tab 48 along a common upper edge defined by the fold line 34. The central portion 53 is also hingedly connected to the flap 33 along fold line 54. Elongated side portions or wings 56, 57 are cut within the flap 33 as indicated by the solid lines in FIGURE 1 and these wings are hingedly connected along each side of the central portion 53 by fold lines 58, 59.

In one step of forming a carton from the blank of FIGURE 1, glue is applied to the underside of flap 33 in the area defined by the broken diagonal lines of FIGURE 1. The flap 33 is then folded behind the panel 16 as viewed in FIGURE 1 and secured thereto so that the tab 48 and central portion 53 with wings 56, 57 attached thereto are positioned in overlapping relationship and move as a a unit.

As shown in FIGURE 1, the inner ply or panel 21 has cut therein a tongue 61 hingedly connected to the panel 21 along a fold line 62. An adhesive is applied to the tongue 61, as shown, extending from the hinged line 62 and onto the panel 21 to the fold line 27 to include a glue spot 63. Means are also cut in the inner panel 21 for admitting the trailing portion of the wing 56, 57, as will be explained hereinafter, which in the embodiment shown constitute flaps 64, 66 hingedly connected to the panel 21 along diagonal score lines 67, 68 respectively.

When the flap 33 has been folded into overlapping relationship with the panel 16 as explained above, the panel 21 or inner ply having an adhesive applied thereto, as shown by the diagonal lines in FIGURE 1, is adhesively secured to the panel 16 with the flap 33 sandwiched therebetween. At the same time, the tongue 61 is glued to the central portion 53 on the flap 33 so that the tab 48, central portion 53, tongue 61 and wings 56, 57 form the pouring spout 47 of the invention. The wings 56, 57 which form the side walls of the spout 47 are sandwiched between the panels 16, 21 in parallel relationship therewith in the closed position of the spout as shown in FIGURES 4, 5. As can be seen, the tab 48, central portion 53 and tongue 61 form the bottom wall of the pouring spout 47. The glue spot 63 detachably secures the upper portion of the central portion 53 to the panel 21 so that the spout 47 is held in the closed position by a seal which can be easily broken when the spout is to be used.

Figure 7:
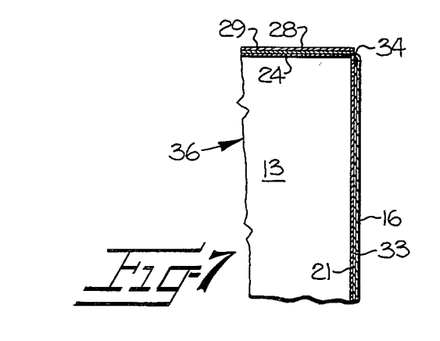
FIGURE 7 is a sectional view taken substantially along line 7—7 of FIGURE 5 in the direction of the arrows.
Figure 8:
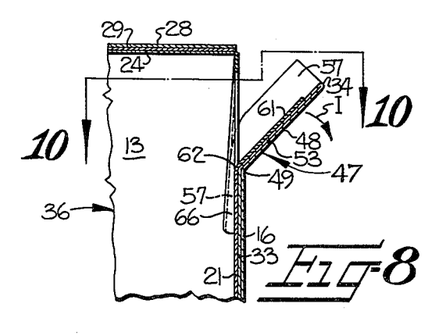
FIGURE 8 is a sectional view taken substantially along the line 8—8 of FIGURE 6 in the direction of the arrows.
Figure 9:
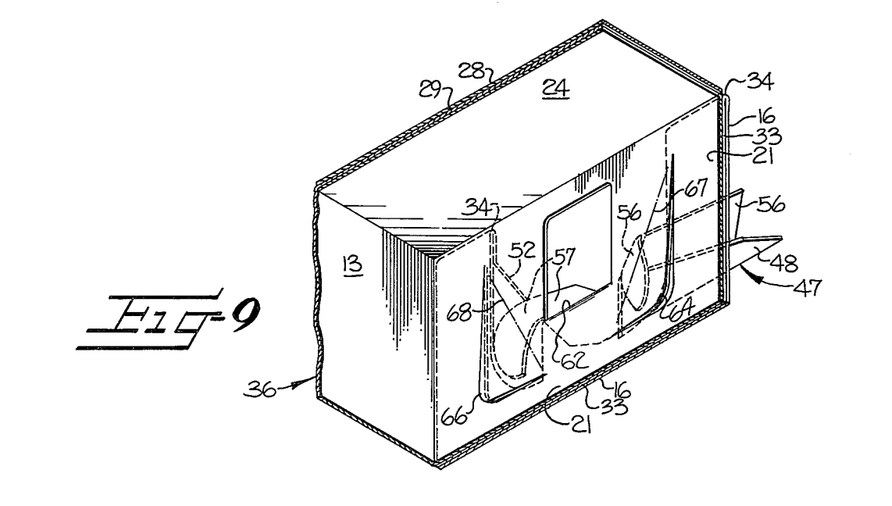
FIGURE 9 is an isometric view of a portion of the interior of the carton of FIGURE 4 with its pouring spout in the open position.
Figure 10:
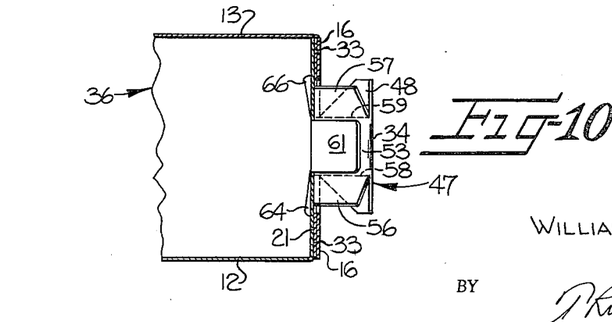
FIGURE 10 is a sectional view taken substantially along line 10—10 of FIGURE 8 in the direction of the arrows.

The folding of the side and end panels 12, 13, 14, 16 and the top and bottom end flaps of the blank together with the flap 33 and inner panel 21 along the previously described fold lines in the conventional manner results in the carton construction 36 shown in FIGURE 4. The panels 16, 21, and flap 33 of the completely set up carton 36 are in a flat overlapping relationship, as shown best in FIGURE 7, and the carton has packaged therein the finely divided material which is to be dispensed through the carton pouring spout 47 by the purchaser. As shown in FIGURES 4, 5 and 7, the carton pouring spout 47 is in the closed position and is thus concealed within the wall of the carton 36 but is readily available for movement to an open position for dispensing the carton contents.

When the material packaged in the carton 36 is to be dispensed, an outward pull on the upper edge of the pouring spout 47 defined by the fold line 34 breaks the bond at the glue spot 63 and the spout is pivoted in the direction of the arrow I to the position shown in FIGURES 6, 8–10. As the spout 47 moves to the open position, the wings 56, 57 move slidably over the side edges 51, 52 respectively of the panel 16. At the same time the trailing portions of the wings 56, 57 move the yielding flaps 64, 66 about their hinge lines 67, 68 respectively as the wings assume the bowed condition shown clearly in FIGURE 9 during their sliding movement. As the trailing portions of the wings 56, 57 are received within the openings in panel 21 defined by the flaps 64, 66, the wings engage the panel edges defined by the hinge lines 67, 68 in sliding contact and are urged against the spout opening side edges 51, 52 thereby forming a seal to prevent the sifting of material from around the pouring spout 47. It should be understood that although hinged flaps 64, 66 are cut into the panel 21 to yieldingly receive the trailing portions of the wings 56, 57 openings corresponding to the shape of the flaps 64, 66 or any suitably shaped openings can be provided in the panel 21 with the resulting edges as are provided by the diagonal lines 67, 68 producing substantially the same spout sealing result as is accomplished with the flaps 64, 66.

After the desired amount of material has been dispensed from the carton 36, the pouring spout 47 may then be moved back to the closed position of FIGURES 4, 5 with the wings moving back into the nested or sandwiched position flush with the panels 16, 21.

Figure 11:
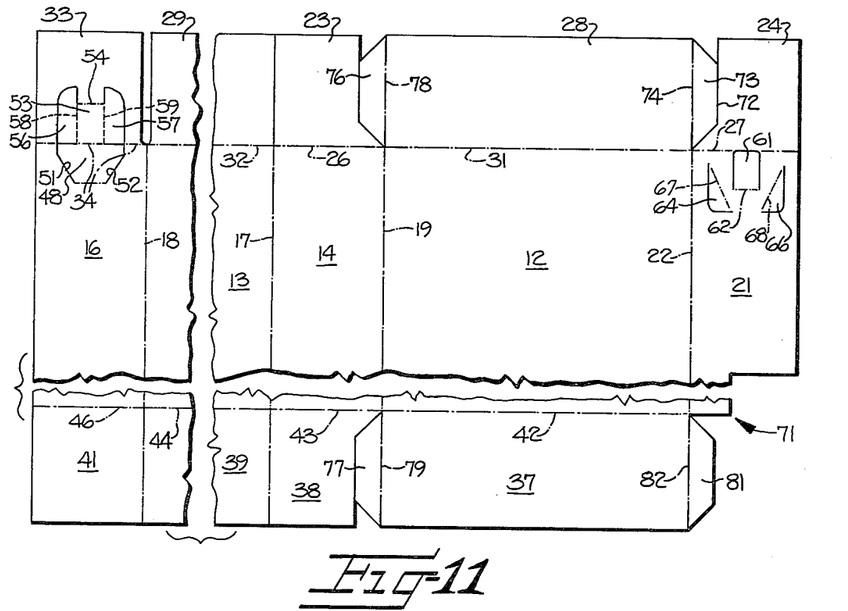
FIGURE 11 is a plan view, partially broken away, of a modified body blank from which a modification of the carton of the invention is formed.
Figures 12, 13:
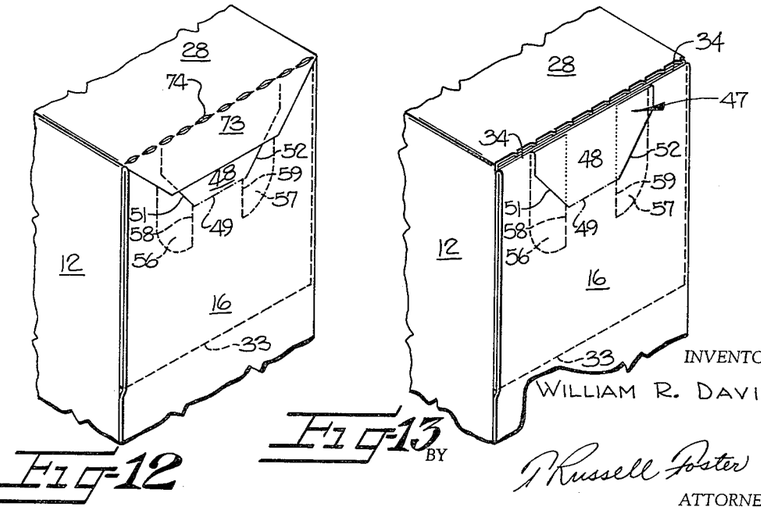
FIGURE 12 is an isometric view of a portion of the carton constructed from the blank of FIGURE 11.
FIGURE 13 is a view similar to FIGURE 12 with a portion of the carton removed.

Referring now to FIGURES 11–13 wherein like numerals identify like parts, there is shown a modification of the carton of FIGURES 1–10. In the carton blank shown in FIGURE 11 and identified by the numeral 71, the top end flap 24 has been cut along line 72 to provide a flap 73 detachably connected to one end of top end flap 28 by means of perforations 74. The flap 73 is of the type generally referred to in the box industry as a "Van Buren ear." Similarly, the other end of flap 28 as well as both ends of bottom end flap 37 may be provided with "Van Buren ears" or flaps 76, 77, 81 connected to their respective flaps 28, 37 along hinge lines 78, 79, 82 respectively.

The body blank 71 of FIGURE 11 is assembled in the manner previously described in the embodiment of FIGURES 1–10 and the flap or ear 73 is folded over in overlapping relationship with the panel 16 and detachably secured thereto by glue or the like to retain the pouring spout 47 in the closed position as shown in FIGURE 12. The flaps 76, 77, 81 are similarly secured in overlapping relationship with their respective carton walls and act to prevent the material packaged in the carton from sifting out of the carton. When the spout 47 is to be used, the glue bond of the ear on flap 73 is broken and the ear removed by tearing along the perforations 74 so that the spout may then be moved to the open position from the closed position shown in FIGURE 13. It will be noted that in the body blank 71, the upper edge of tongue 61 on panel 21 is positioned flush with the fold line 27 and a glue spot such as the glue spot 63 of the embodiment shown in FIGURE 1 is not employed due to the spout retaining action of the ear 73. However, the tongue 61 can be positioned as in the embodiment of FIGURES 1–10 and a glue spot 63 used in combination with the Van Buren ear 73.

Figure 14:
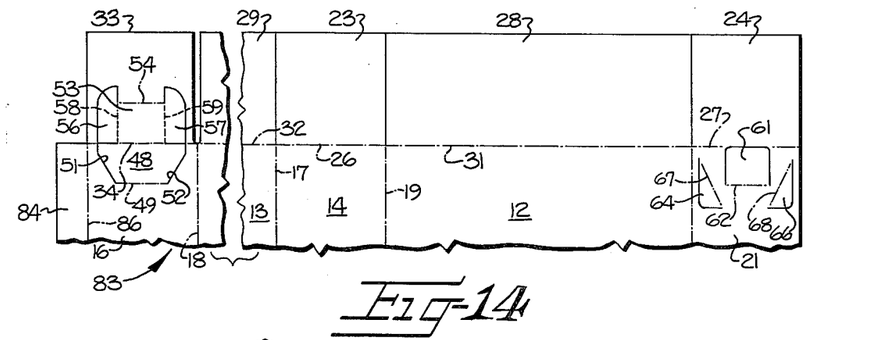
FIGURE 14 is a plan view of a portion of another body blank from which a second modification of the carton of the invention is constructed.
Figure 15:
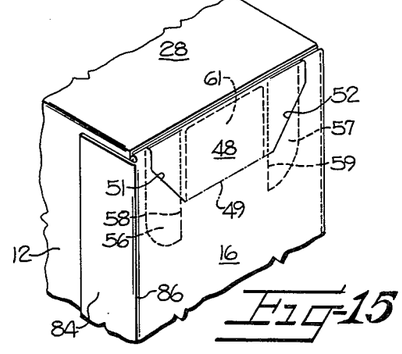
FIGURE 15 is an isometric view of a portion of the carton constructed from the body blank of FIGURE 14 illustrating the pouring spout in a closed position.
Figure 16:
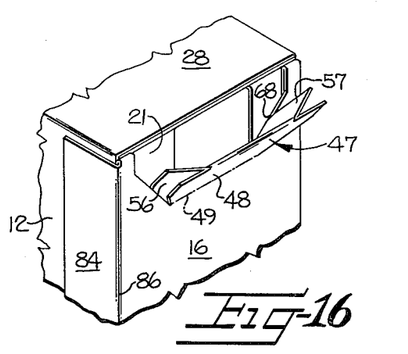
FIGURE 16 is a view similar to FIGURE 15 with the pouring spout in the open position.

Referring now to FIGURES 14–16 wherein like numerals indicate like parts, there is shown a second modification of the carton of the invention which utilizes a body blank similar to the body blank of FIGURE 11. The body blank shown in FIGURE 14, which is identified by the numeral 83, is provided with a glue flap 84 integrally connected by means of a fold line 86 to the panel 16. When the body blank 83 is assembled into the carton of the invention as shown in FIGURES 15, 16, the glue flap 84 is secured by means of adhesive or the like to the side wall 12 of the carton.

With the use of the glue flap 84, a pouring spout 47 of greater width than that generally permitted in a relatively narrow carton may be used without any sacrifice of the structural strength of the carton which might otherwise occur as a result of a reduction in the width of the side portions of panel 16, flap 33 and panel 21 adjacent the spout. As can be seen, a reduction in the width of these side portions results in a reduction in glue area which would tend to produce a delamination of panel 16, flap 33 and panel 21.

Figure 17:
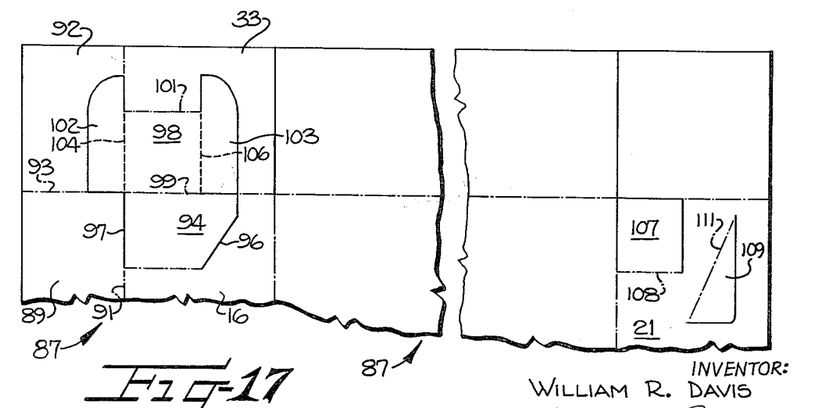
FIGURE 17 is a plan view of a portion of another body blank from which a third modification of the carton of the invention is constructed.
Figure 19:
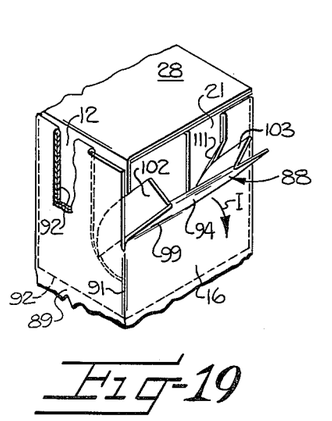
FIGURE 19 is a view similar to FIGURE 18 illustrating the pouring spot in the open position.

Referring now to FIGURES 17–19, there is shown a third modification of the carton of the invention wherein a body blank, designated generally by the numeral 87 in FIGURE 17, is cut in such a manner as to provide for a pouring spout 88 as shown best in FIGURE 19, on a relatively narrow carton.

In the blank of FIGURE 17, a panel 89 is integrally connected to the panel 16 along a fold line 91. A top end flap 92 is also provided in the blank which is connected to the panel 89 along a fold line 93. A tab 94 is cut within the panel 16 to form a panel opening having one diagonal side edge 96 and a straight side edge 97 coinciding with the fold line 91. The flap 33 is provided with a central flap portion 98 integrally connected to the tab 94 by means of a fold line 99 forming a common upper edge and hingedly connected to the flap 33 by means of a fold line 101. The central flap portion 98 has connected thereto along each side, elongated wings 102, 103 shaped similarly to the wings of the previous embodiments which wings are connected to the central portion 98 by means of fold lines 104, 106 respectively. Wing 103 is cut in the flap 33 and the wing 102 is cut in the flap 92. The panel 21 has cut therein a tongue 107 hingedly connected to the panel 21 by means of a fold line 108 and a single yieldable flap 109 is cut in the panel 21 for pivotal movement along the diagonal line 111 as in the blank of FIGURE 1.

Figure 18:
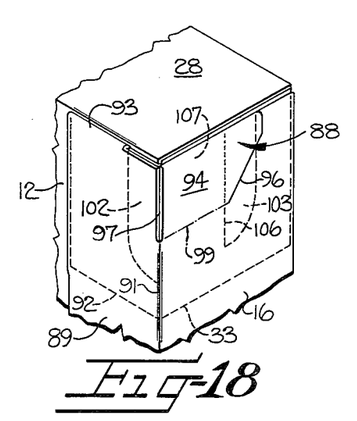
FIGURE 18 is an isometric view of a portion of a carton constructed from the body blank of FIGURE 17 illustrating the pouring spout in the closed position.

As shown in FIGURES 18, 19, the blank 87 of FIGURE 17 is assembled into a carton in the manner described above for the previous embodiments with the flaps 33, 92 folded behind the panels 16, 89 respectively as viewed in FIGURE 17 and glued thereto. The panel 89 and flap 92 are then secured by glue or the like to the carton side wall 12 as shown so that the side wing 102 is sandwiched between the panel 89 and side wall 12 at substantially a right angle to the bottom wall of spout 88 in the closed position of the spout. It will be noted that the spout bottom wall is formed from the overlapping tab 94, central flap portion 98 and tongue 107 adhesively secured thereto.

When the spout 88 is to be moved to the opened position, the spout is pivoted outwardly in the direction of the arrow I as shown in FIGURE 19 with the wing 103 sliding over the side edge 96 of the opening in panel 16 and with the trailing portion of the wing 103 moving against the yielding flap 109 over the diagonal line 111 as described in the previous embodiments. The other wing 102 does not bend but merely moves as shown from its nested or sandwiched position in FIGURE 18 outwardly during the movement of the spout 88 to the open position so that the wing 102 forms with the wing 103 upstanding sides for the pouring spout 88.

Figures 20, 21, 22:
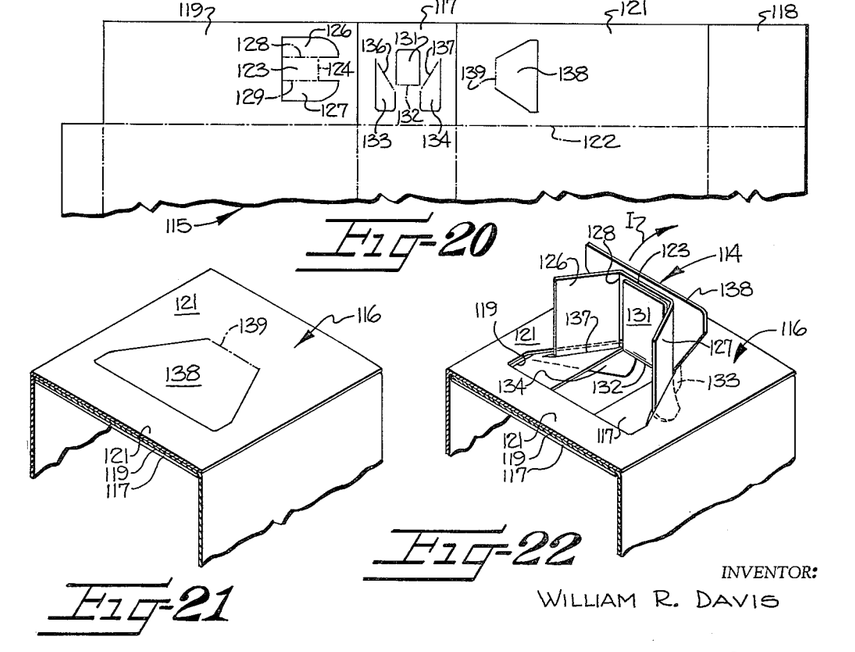
FIGURE 20 is a plan view of a portion of still another body blank from which is constructed a fourth modification of the carton of the invention.
FIGURE 21 is an isometric view of a portion of a carton constructed from the blank of FIGURE 20 illustrating the pouring spout in the closed position.
FIGURE 22 is a view similar to FIGURE 21 illustrating the pouring spout in the open position.

In the embodiment of FIGURES 20–22, the pouring spout, designated generally by the numeral 114 in FIGURE 22, is formed in the top wall of a carton. The carton top wall 116 of this embodiment is formed from top end flaps 117–119, 121. All of these top end flaps are hingedly connected to the side and end panels of the carton by means of a fold line 122. Flap 119, the intermediate ply, has cut therein a central flap portion 123 hingedly connected thereto along hinge line 124 with side wings 126, 127, also cut in flap 119, connected to portion 123 along hinge lines 128, 129 respectively.

Flap 117, the inner ply, has cut therein a tongue 131 hingedly connected to the flap by means of a hinge line 132 and hinged flaps 133, 134 hingedly connected to the flap 117 by diagonal score lines 136, 137 respectively. The end flap 121 or outer ply has a tab 138 cut therein hingedly connected to flap 121 along a hinge line 139.

When the top wall 116 is formed from the blank 115, the intermediate flap 119 is sandwiched between the inner flap 117 and the outer flap 121 and the tab 138, central portion 123 and tongue 131 are secured together by means of glue or the like as described in the previous embodiments. With this arrangement, the pouring spout 114 is formed which may be pivoted from the closed position of FIGURE 21 to the open position of FIGURE 22 in the direction of the arrow I with the trailing portions of the wings 126, 127 being yieldably received within the opening defined by the flaps 133, 134 respectively.

With the novel construction of this invention, there has been provided a new and novel carton having a pouring spout carton which is formed from a body blank cut from a single piece of material such as paperboard or the like. Glue is applied to this body blank at selected locations and the blank may be easily and quickly assembled in a set-up condition to form a carton with the pouring spout integrally formed therein. The body blank parts forming the pouring spout are arranged in a novel manner so that the manipulation of the spout between an open and a closed position during use does not produce delamination or deterioration of the spout common to presently known spout constructions throughout the useful life of the carton.

In the closed position of the pouring spout, the spout sides or wings are sandwiched inconspicuously within the carton wall and move to an upright position for forming the spout sides during the manipulation of the spout to the open position. As a result of the novel construction of the carton, this movement of the wings as the spout is manipulated is accomplished without wrinkling, creasing or otherwise damaging the wings as the carton construction eliminates any destructive bending of the wings. Furthermore, this elimination of destructive bending of the wings is accompanied by an action whereby the wings prevent the finely divided material in the carton from sifting out of the carton around the spout due to the sealing action of the wings during its sliding movement between the open and closed positions of the spout. The novel arrangement of the invention lends itself to the incorporation of the spout in an inexpensive carton construction and in any selected wall on a carton having any width within a wide range without any sacrifice of novel results of the invention.

While there has been described what at present is considered to be the preferred embodiments of the invention, it will be understood by those skilled in the art that various changes and modifications may be made therein without departing from the invention and, therefore, it is the aim of the appended claims to cover all such changes and modifications as fall within the true spirit and scope of the invention.

Having thus described the invention, what is claimed is:

1. In a carton having a pouring spout formed from a one-piece body blank comprising, in combination, a wall on said carton including an outer ply, an intermediate ply and an inner ply secured together in overlapping relationship, said intermediate ply and said outer ply integrally connected together along a common upper edge defined by a fold line, a hinged tab cut in said outer ply defining a spout opening having side edges, a hinged central portion having elongated wings hingedly connected thereto along each side cut in intermediate ply, said tab and said central portion having an upper edge defined by said common edge, a hinged tongue cut in said inner ply defining an opening in said inner ply, means for securing said tongue, said central portion and said tab together in overlapping relationship to form with said wings a pouring spout movable between a closed position flush with said carton and an open position with said wings movable slidably over the side edges of said outer ply spout opening from a retracted position between said inner and outer plies in the closed position of said spout to an elevated position to form side walls for said spout in said spout open position, means cut in said inner ply for admitting the trailing portion of said wings during said sliding movement and for urging said wings against said spout opening side edges to thereby reduce the bending of said wings around said side edges and to prevent finely divided material packaged in said carton from sifting out around said pouring spout.

2. In a carton having a pouring spout formed from a one-piece body blank comprising, in combination, a wall on said carton including an outer ply, an intermediate ply and an inner ply secured together in overlapping relationship, a hinged tab cut in said outer ply defining a spout opening having side edges, a hinged central portion having elongated wings hingedly connected thereto along each side cut in said intermediate ply, a hinged tongue cut in said inner ply defining an opening in said inner ply, means for securing said tongue, said central portion and said tab together in overlapping relationship to form with said wings a pouring spout movable between a closed position flush with said carton wall and an open position with said wings movable slidably over the side edges of said outer ply spout opening from a retracted position between said inner and outer plies in the closed position of said spout to an elevated position to form side walls for said spout in said spout open position, means cut in said inner ply for admitting the trailing portion of said wings during said sliding movement and for urging said wings against said spout opening side edges to thereby reduce the bending of said wings around said side edges and to prevent finely divided material packaged in said carton from sifting out around said pouring spout.

3. A carton in accordance with claim 2 wherein said means in said inner ply include a pair of hinged flaps cut in said inner ply, each of said flaps arranged to yieldingly admit the trailing portion of one of said wings during said sliding movement with the hinge line for said flaps defining an edge on said inner ply for urging said wings against said spout opening side edges.

4. A carton in accordance with claim 2 including a hinged flap on said carton movable into overlapping relationship with said tab in the closed position of said spout and means for detachably securing said flap in said overlapping relationship to retain said pouring spout in said closed position.

5. A folding carton in accordance with claim 2 including a panel integrally connected to said outer ply along a fold line, a side wall on said carton adjacent said wall incorporating said outer ply, and means for securing said panel to said side wall for retaining said outer ply in overlapping relationship with said intermediate and inner plies.

6. In a carton having a pouring spout formed from a one-piece body blank comprising, in combination, a first wall on said carton including an outer ply, an intermediate ply and an inner ply secured together in overlapping relationship, said intermediate ply and said outer ply integrally connected together along a common upper edge defined by a fold line, a second wall on said carton extending at substantially a right angle to said first wall to define therewith a corner on said carton, a hinged tab cut in said outer ply defining a spout opening having side edges, one of said side edges coinciding with said corner, a hinged central portion having a first elongated wing hingedly connected along one side cut in said intermediate ply, a second elongated wing hingedly connected to the other side of said central portion, said tab and said central portion having an upper edge defined by said common edge, a hinged tongue cut in said inner ply defining an opening in said inner ply, means for securing said tongue, said central portion and said tab together in overlapping relationship to form with said wings a pouring spout, a side panel integrally connected to said outer ply, means for securing said side panel in overlapping relationship with said second wall with said second wing sandwiched therebetween, said pouring spout movable between a closed position flush with said carton first wall with said second wing sandwiched between said side panel and said second wall and said first wing sandwiched between said inner and outer plies and an open position with said second wing movable outwardly from said sandwiched position and said first wing movable slidably over the other side edge of said outer ply spout opening to an elevated position to form side walls for said spout in said spout open position.

7. A folding carton in accordance with claim 6 including means cut in said inner ply for admitting the trailing portion of said first wing during said sliding movement and for urging said wing against said other spout opening side edge to thereby reduce the bending of said wing around said side edge and to prevent finely divided material packaged in said carton from sifting out around said pouring spout.

8. In a carton having a pouring spout formed from a one-piece body blank comprising, in combination, a top wall on said carton including an inner flap, an intermediate flap and a top flap secured together in overlapping relationship, a hinged tab cut in said outer flap defining a spout opening having side edges, a hinged central portion having elongated wings hingedly connected thereto along each side cut in said intermediate flaps, a hinged tongue cut in said inner flap defining an opening in said inner flap, means for securing said tongue, said central portion and said tab together in overlapping relationship to form with said wings a pouring spout movable between a closed position flush with said carton top wall and an open position with said wings movable slidably over the side edges of said outer flap spout opening from a retracted position between said inner and outer flaps in the closed position of said spout to an elevated position to form side walls for said spout in said spout open position, means cut in said inner flap for admitting the trailing portion of said wings during said sliding movement and for urging said wings against said spout opening side edges to thereby reduce the bending of said wings around said side edges and to prevent finely divided material packaged in said carton from sifting out around said pouring spout.

References Cited in the file of this patent
UNITED STATES PATENTS

| | | |
|---|---|---|
| 2,341,397 | Smith | Feb. 8, 1944 |
| 2,742,220 | Lynes | Apr. 17, 1956 |
| 2,760,708 | Phillips | Aug. 28, 1956 |
| 3,017,065 | Collie | June 16, 1962 |